(12) United States Patent
Firestone et al.

(10) Patent No.: US 11,750,394 B2
(45) Date of Patent: Sep. 5, 2023

(54) SECURE DECENTRALIZED P2P FILESYSTEM

(71) Applicant: CyLogic, Inc., Chevy Chase, MD (US)

(72) Inventors: Adam Firestone, Alexandria, VA (US); Hilary L MacMillan, Ashburn, VA (US); Raghu Lingampally, Hyderabad (IN)

(73) Assignee: CyLogic, Inc., Chevy Chase, MD (US)

( * ) Notice: Subject to any disclaimer, the term of this patent is extended or adjusted under 35 U.S.C. 154(b) by 0 days.

(21) Appl. No.: 17/660,409

(22) Filed: Apr. 24, 2022

(65) Prior Publication Data

US 2022/0321353 A1 Oct. 6, 2022

Related U.S. Application Data

(63) Continuation of application No. 17/398,329, filed on Aug. 10, 2021, now Pat. No. 11,314,886.

(Continued)

(51) Int. Cl.
*H04L 9/32* (2006.01)
*G06F 21/62* (2013.01)
(Continued)

(52) U.S. Cl.
CPC .......... *H04L 9/3236* (2013.01); *G06F 16/176* (2019.01); *G06F 16/1837* (2019.01); *G06F 21/602* (2013.01); *G06F 21/606* (2013.01); *G06F 21/6218* (2013.01); *G06F 21/6227* (2013.01); *H04L 9/0643* (2013.01); *H04L 9/085* (2013.01); *H04L 9/0825* (2013.01); *H04L 9/0863* (2013.01); *H04L 9/0866* (2013.01);
(Continued)

(58) Field of Classification Search
CPC ... H04L 9/3236; H04L 9/0643; H04L 9/0825; H04L 9/085; H04L 9/0863; H04L 9/0866; H04L 9/0869; H04L 9/0894; H04L 9/30; H04L 9/3213; H04L 9/3239; H04L 9/50; G06F 16/176; G06F 16/1837; G06F 21/602; G06F 21/606; G06F 21/6218; G06F 21/6227; G06F 2221/2107
See application file for complete search history.

(56) References Cited

U.S. PATENT DOCUMENTS

6,834,112 B1* 12/2004 Brickell ................ H04L 9/3236
  380/279
9,258,122 B1* 2/2016 Zhang .................. G06F 16/148
(Continued)

*Primary Examiner* — J. Brant Murphy
(74) *Attorney, Agent, or Firm* — Kasha Law LLC; John R. Kasha; Kelly L. Kasha (57) ABSTRACT

In a method for decrypting persistent user cryptographic keys in a distributed cryptographically secured peer-to-peer filesystem, a primary input value is received from a first user on a first peer device. A symmetric user encryption key UK1 is generated for the first user from the primary input value (Continued)

on the first peer device. An encrypted private key ePrK1 is requested and received from a non-volatile memory of a data persistence server using the first peer device. The encrypted private key ePrK1 is decrypted using the symmetric user encryption key UK1 using a symmetric decryption algorithm on the first peer device, producing a private key $PrK1=ES_{UK1}^{-1}(ePrK1)$. The private key PrK1 is used to reconstruct a distributed file.

4 Claims, 8 Drawing Sheets

Related U.S. Application Data (60) Provisional application No. 63/228,186, filed on Aug. 2, 2021, provisional application No. 63/226,265, filed on Jul. 28, 2021, provisional application No. 63/226,241, filed on Jul. 28, 2021, provisional application No. 63/170,331, filed on Apr. 2, 2021.

(51) Int. Cl.
| | |
|---|---|
| *H04L 9/08* | (2006.01) |
| *G06F 21/60* | (2013.01) |
| *G06F 16/182* | (2019.01) |
| *G06F 16/176* | (2019.01) |
| *H04L 9/30* | (2006.01) |
| *H04L 9/06* | (2006.01) |
| *H04L 9/00* | (2022.01) |

(52) U.S. Cl.
CPC .......... *H04L 9/0869* (2013.01); *H04L 9/0894* (2013.01); *H04L 9/30* (2013.01); *H04L 9/3213* (2013.01); *H04L 9/3239* (2013.01); *H04L 9/50* (2022.05)

(56) References Cited

U.S. PATENT DOCUMENTS

| | | | |
|---|---|---|---|
| 9,363,247 B2* | 6/2016 | Murray | G06F 16/00 |
| 11,182,349 B2* | 11/2021 | Hornquist Astrand | H04L 9/3247 |
| 2007/0078775 A1* | 4/2007 | Huapaya | G06Q 30/06 705/59 |
| 2011/0125849 A1* | 5/2011 | Boyd | H04L 63/123 709/204 |
| 2015/0113279 A1* | 4/2015 | Andersen | G06F 21/6218 713/171 |
| 2015/0288664 A1* | 10/2015 | Murray | G06F 21/602 713/165 |
| 2016/0014110 A1* | 1/2016 | Kurspahic | H04L 63/083 713/183 |
| 2016/0070894 A1* | 3/2016 | Boodaei | H04L 9/0825 713/155 |
| 2017/0063531 A1* | 3/2017 | Sullivan | G06F 21/6209 |
| 2017/0063981 A1* | 3/2017 | Hyun | H04L 43/0817 |
| 2017/0372042 A1* | 12/2017 | Isles | H04L 9/3247 |
| 2018/0012032 A1* | 1/2018 | Radich | H04L 9/30 |
| 2018/0091487 A1* | 3/2018 | Lin | H04L 9/0894 |
| 2019/0180027 A1* | 6/2019 | Almeida | G06F 8/61 |
| 2019/0280877 A1* | 9/2019 | Isles | H04L 63/126 |
| 2019/0286614 A1* | 9/2019 | Hornquist Astrand | H04L 9/0819 |

* cited by examiner

SECURE DECENTRALIZED P2P FILESYSTEM

RELATED APPLICATIONS

This application is a continuation of U.S. patent application Ser. No. 17/398,329, filed on Aug. 10, 2021, which claims the benefit of U.S. Provisional Patent Application Ser. No. 63/226,241, filed on Jul. 28, 2021, U.S. Provisional Patent Application Ser. No. 63/226,265, filed on Jul. 28, 2021, U.S. Provisional Patent Application Ser. No. 63/170,331, filed on Apr. 2, 2021, U.S. Provisional Patent Application Ser. No. 63/228,186, filed on Aug. 2, 2021, the contents of all of which are incorporated by reference herein in their entireties.

INTRODUCTION

The teachings herein relate to a decentralized or distributed filesystem. More particularly the teachings herein relate to systems and methods for securely storing, retrieving, and sharing files in a peer-to-peer distributed file system using symmetric encryption keys wrapped by asymmetric encryption keys.

Figure 1:
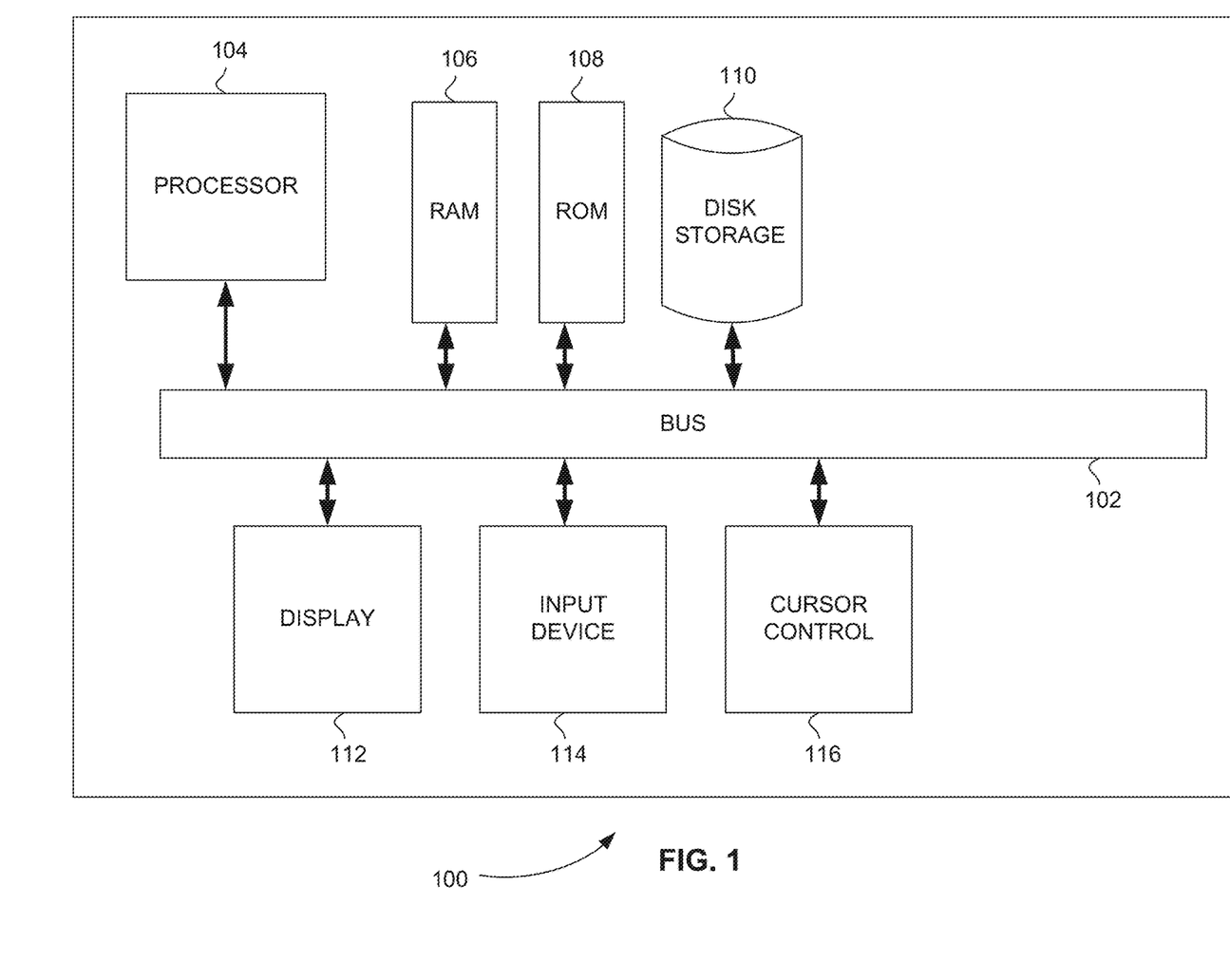
FIG. 1 is a block diagram that illustrates a computer system, upon which embodiments of the present teachings may be implemented.

The systems and methods herein can be performed in conjunction with a processor, controller, or computer system, such as the computer system of FIG. 1.

Decentralized File Systems

Modern computer networks have evolved around the notion of information and infrastructure centralization. While this paradigm has offered benefits in terms of physical and information security for data residing on an organization's servers, and a concentration of management resources, it has often been found lacking with respect to data durability and economy of operation. Regarding data durability, centralization creates a single point of failure. If the server or data center is rendered unavailable or inoperable, the organization(s) reliant on the information residing on that physical infrastructure can find themselves without access to their most critical resource. Additionally, the operational costs associated with information technology infrastructure, as well as the skilled professionals required to operate it, are very significant, and often pose a constraint on organizational goals and ambitions.

The response to the conventional paradigm has been the development of the decentralized file system. Decentralized file systems ensure data durability by distributing information between all participants rather than in one central hub that represents a single point of failure. They neutralize denial of availability attacks such as ransomware through the use of content-based addressing instead of conventional location-based addressing that mitigates or eliminates the attackers' return on investment (ROI). Content-based addressing turns all participants into super-nodes that are simultaneously clients and servers, eliminating the need for centralized file management infrastructure, and enabling organizations that embrace decentralization to reduce or eliminate the associated hardware and personnel costs.

Despite their advantages, decentralized file systems have not enjoyed widespread adoption due to the fact that they do not provide adequate information confidentiality. That is, their underlying architecture ensures that all participants have access to all information at all times. This runs contrary to organizational requirements to safeguard data and control access.

Instead, decentralized file systems have primarily be used for public file sharing. For example, BitTorrent is a popular peer-to-peer (P2P) public file-sharing protocol.

Figure 2:
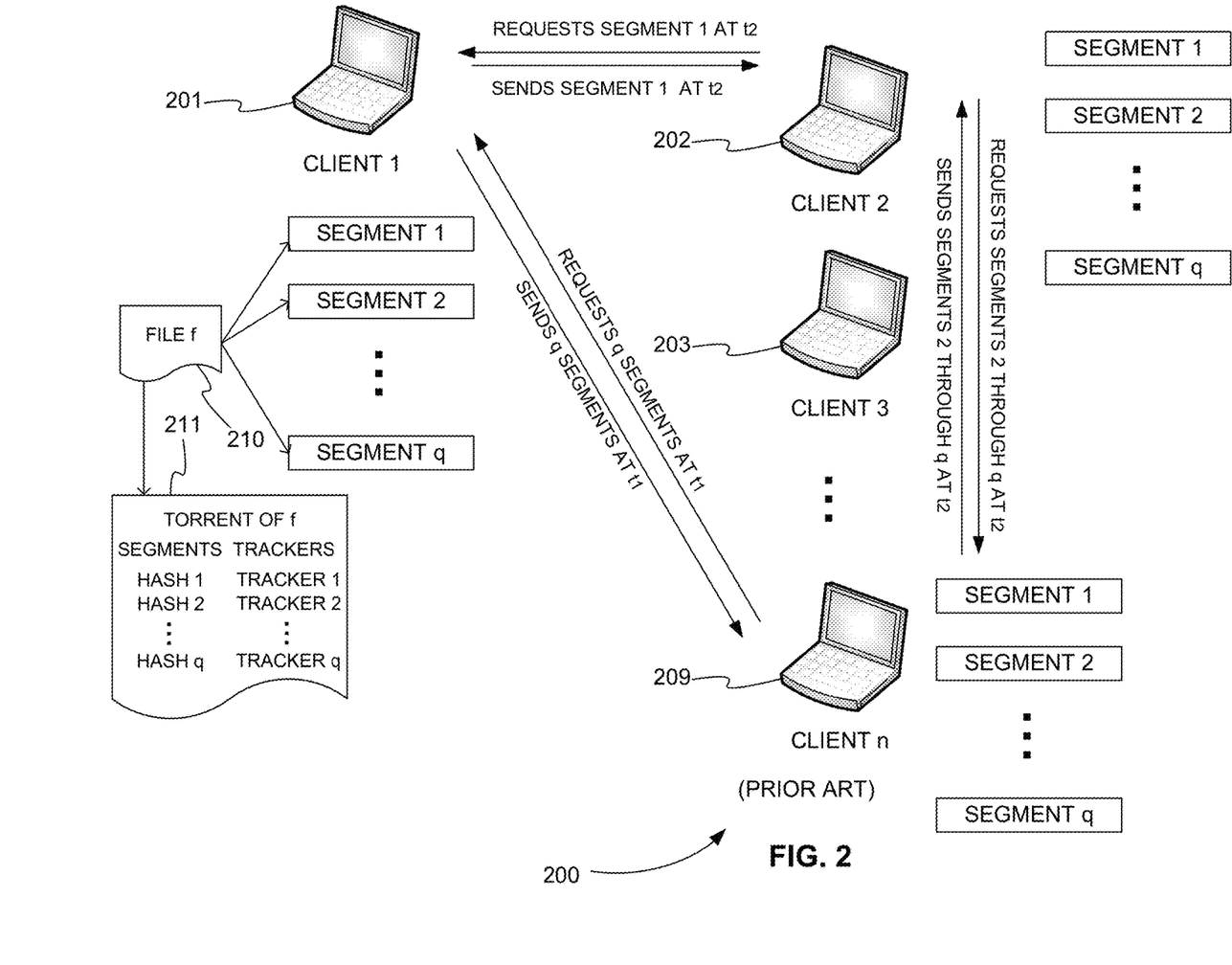
FIG. 2 is an exemplary diagram showing how a file is publicly shared by a BitTorrent client application.

FIG. 2 is an exemplary diagram 200 showing how a file is publicly shared by a BitTorrent client application. For example, in order to share file 210 originally located only on client device 201, a BitTorrent client application of client device 201 divides file 210 into q equal length pieces or segments and hashes each segment with a unique cryptographic hash key or hash value, producing q cryptographic hash values. The BitTorrent client application of client device 201 then creates a descriptor file 211, called a torrent, for file 210 that uniquely identifies the file.

A cryptographic hash value is a bit array of fixed size that uniquely and mathematically represents the data of a file, for example. The cryptographic hash value is found from the data of the file using a mathematical algorithm. As a result, a reconstructed file, for example, can be verified by applying the mathematical algorithm to the data of the reconstructed file and then comparing the cryptographic hash value that is produced with the previous cryptographic hash value of the original file.

Descriptor file 211 includes at least two lists. The first list is a list of the q cryptographic hash values corresponding to the q equal length segments. The second list is a list of m tracker devices (servers) that keep track of client devices (peers) that include one or more of the segments of file 210.

To enable sharing of file 210, for example, descriptor file 211 is sent to the m tracker devices (not shown). Since no segments have been shared at this point, each of the m tracker devices is only aware that client device 201 includes all of the segments of file 210.

At time $t_1$, for example, a BitTorrent client application of client device 209 is looking for file 210 and finds file descriptor 211 on one of the m tracker devices or some other server device, or is sent torrent or file descriptor 211 by someone referring the user of client device 209 to file 210. File descriptor 211 additionally includes the filename of file 210 and metadata about file 210. File descriptor 211 can be found on a tracker or another server using a filename or piece of metadata. Using file descriptor 211 and information from the tracker, client device 209 learns that device 201 includes q segments of file 210 and requests all q segments from client device 201 since it is currently the only client to include any segment.

In response, the BitTorrent client application of client device 201 sends all q segments to client device 209. The BitTorrent client application of client device 209 then updates the m tracker devices to let them know that, in addition to client device 201, client device 209 now has a copy of all q segments of file 210. Finally, client device 209 reconstructs file 210 from the q segments of file 210 using the q cryptographic hash values of file descriptor 211.

At a later time $t_2$, for example, a BitTorrent client application of client device 202 is also looking for file 210 and finds file descriptor 211 on one of them tracker devices. Using file descriptor 211 and information from the tracker, client device 202 learns that both devices 201 and 209 include q segments of file 210. The BitTorrent client application of client device 202 determines the most efficient method of obtaining the q segments of file 210 from devices 201 and 209. For example, client device 202 requests segment 1 from device 201 and segments 2 through q from device 209.

In response, the BitTorrent client application of client device 201 sends segment 1 to client device 202, and client device 209 sends segments 2 through q to client device 202.

The BitTorrent client application of client device 202 then updates the m tracker devices to let them know that, in addition to client devices 201 and 209, client device 202 now has a copy of all q segments of file 210. Finally, client device 202 reconstructs file 210 from the q segments of file 210 using the q cryptographic hash values of file descriptor 211.

FIG. 2 illustrates how a file is found and downloaded in BitTorrent using a tracker. In more recent versions of BitTorrent, peers or client devices can locate a torrent directly using a distributed hash table (DHT). A DHT is a lookup service with key-value pairs. In theory, the DHT is decentralized. In practice, it is typically located on one or two servers. To find the location of nearby (in the network sense) client devices that include the desired file, a client device queries the DHT using a hash of the torrent of the desired file. The returned list of client devices is then used to retrieve segments of the file.

Figure 3:
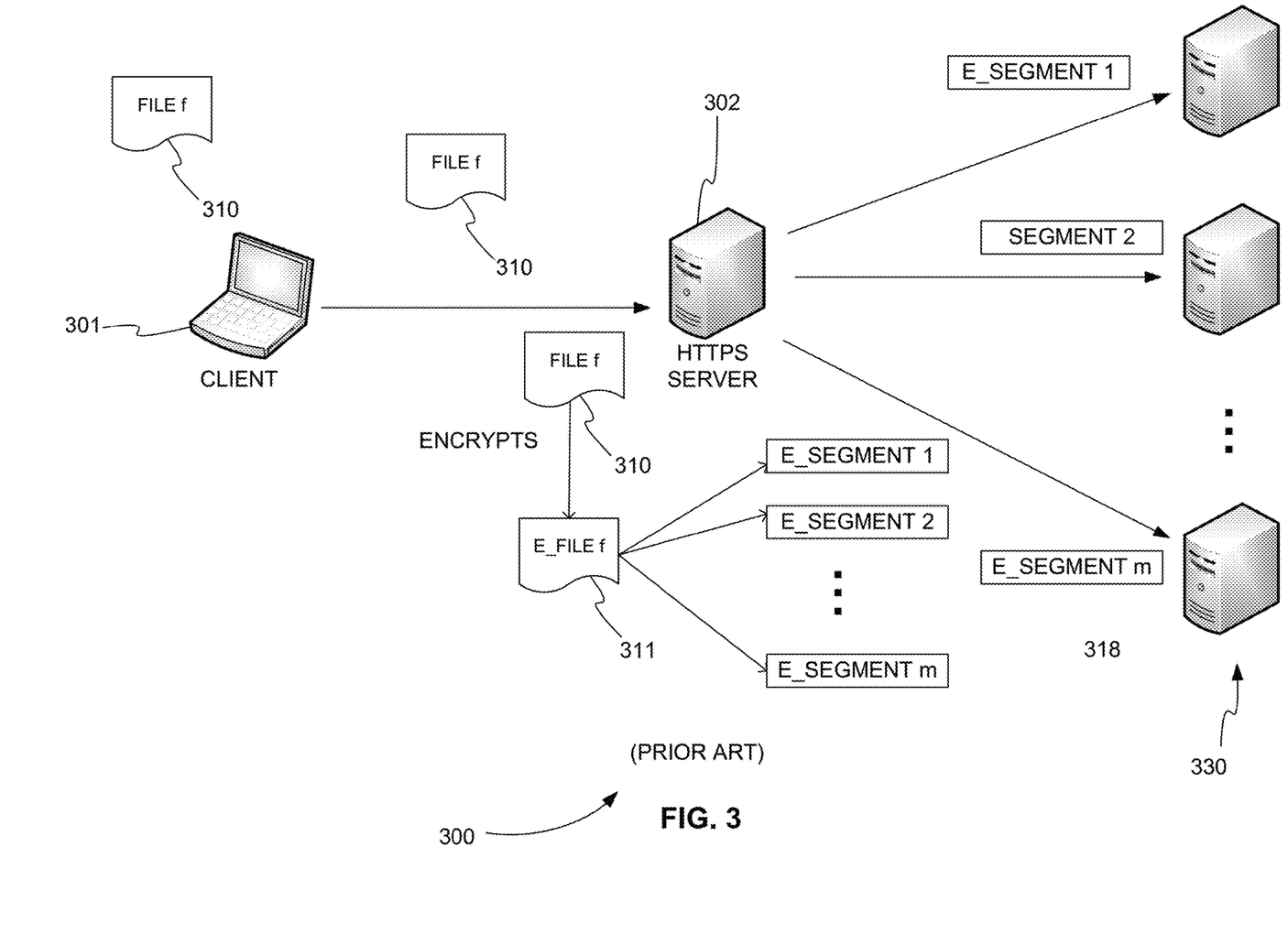
FIG. 3 is an exemplary diagram showing how a file is securely stored in Tahoe-LAFS.

Although popular for sharing publicly available information, BitTorrent is not suitable for use as a distributed file system because it lacks facilities for maintaining information confidentiality among users. Tahoe least-authority file store (Tahoe-LAFS) is an exemplary open-source distributed data store that is sometimes described as a distributed file system. Tahoe-LAFS includes a method for maintaining information confidentiality among users FIG. 3 is an exemplary diagram 300 showing how a file is securely stored in Tahoe-LAFS. File 310 is, for example, created on client device 301. Instead of storing file 310 on client device 301, Tahoe-LAFS sends unencrypted file 310 to secure hypertext transfer protocol (HTTPS) server 302 using a secure HTTPS connection to HTTPS server 302. HTTPS server 302 encrypts file 310 and then divides encrypted file 311 into m pieces or segments using erasure coding. Erasure coding allows file 311 to be reconstructed from some number of the m segments that is less than m. Each of the m segments is then distributed to a different server among servers 330.

When client 301 wants to retrieve file 310, it requests the file from HTTPS server 302. HTTPS server 302 then retrieves some number of the m segments that is less than m from servers 330, decodes the segments producing encrypted file 311, and decrypts file 311 producing file 310. File 310 is then returned to client 301 using a secure HTTPS connection from HTTPS server 302.

Tahoe-LAFS securely stores files but is not a P2P system. Instead, Tahoe-LAFS acts like a redundant array of inexpensive disks (RAID) system where servers are used in place of local storage or disk drives. Tahoe-LAFS is therefore not conducive to file sharing among client devices.

Cleversafe is another distributed data store that can be used as a distributed file system. Like Tahoe-LAFS, Cleversafe divides encrypted files into m pieces or segments using erasure coding and stores the segments on different servers. Additionally, Cleversafe uses unique object identifiers (IDs) to identify each file in the system. This allows Cleversafe to store files in a flat-file system rather than in a tree-like hierarchical structure, which is most commonly used by traditional file systems. A flat file system can allow more data to be stored.

Unfortunately, also like Tahoe-LAFS, Cleversafe is not a P2P system. It is again more similar to a RAID system, where servers are used in place of local storage or disk drives. It is, therefore, less useful for sharing files.

Further, Bian, J. and R. Seker. "JigDFS: A secure distributed file system." 2009 *IEEE Symposium on Computational Intelligence in Cyber Security* (2009): 76-82 (hereinafter the "Bian Paper") describes another problem with Tahoe-LAFS and Cleversafe. The Bian Paper suggests that the lack of anonymity or deniability in systems like Tahoe-LAFS and Cleversafe makes them less useful in commercial or business settings. For example, the use of central servers in Tahoe-LAFS and Cleversafe make it easier to track the owners or editors of certain files. As a result, it would be possible, for example, to link a file for anonymous feedback to its editors in these systems.

In response to this problem, the Bian Paper proposes the jigsaw distributed file system (JigDFS). JigDFS is a secure P2P distributed file system. According to the Bian Paper, the use of a fully P2P distributed system "eliminates the possible leakage of user information from a central server."

Figure 4:
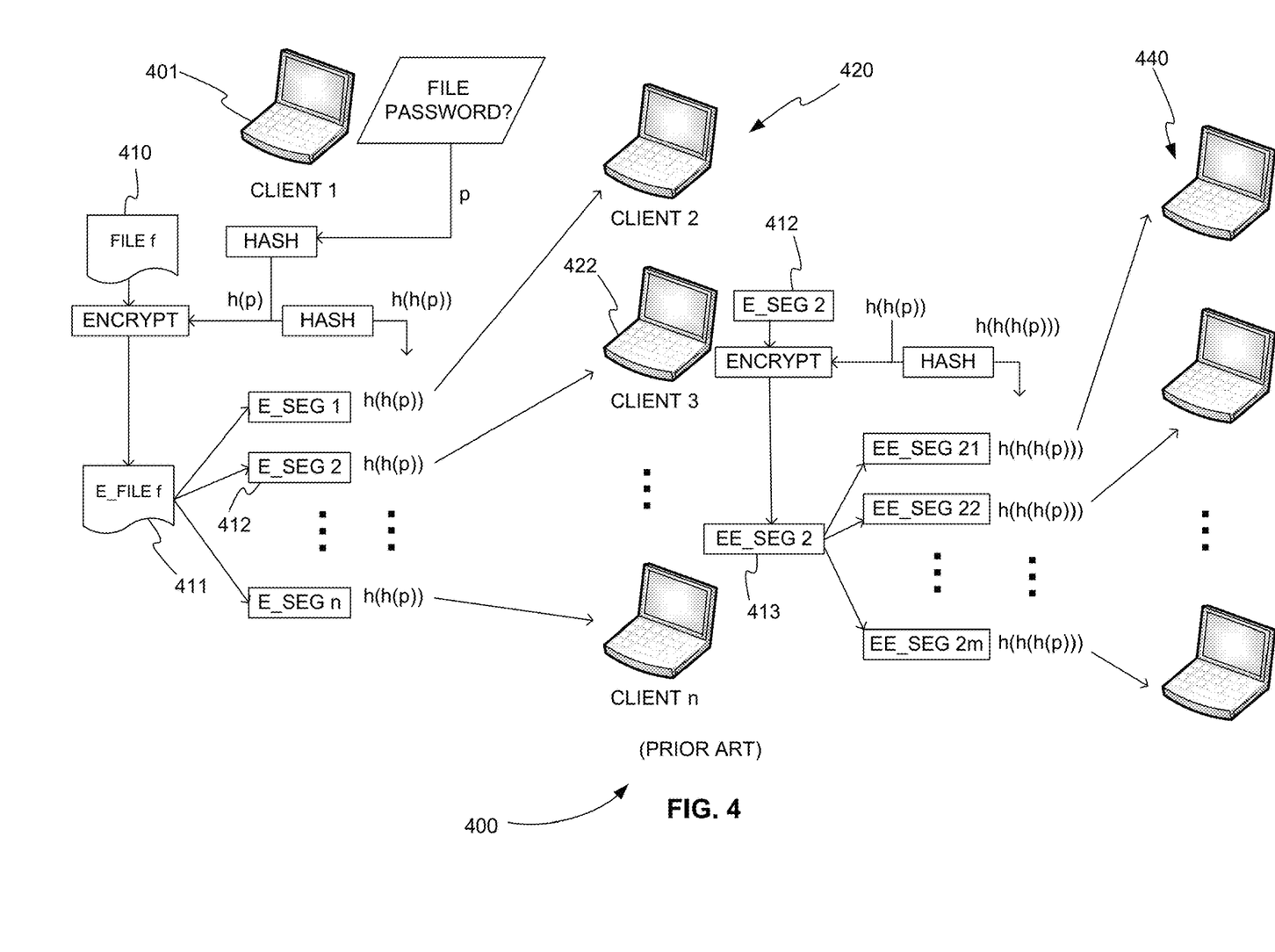
FIG. 4 is an exemplary diagram showing how a file is securely stored in JigDFS.

FIG. 4 is an exemplary diagram 400 showing how a file is securely stored in JigDFS. File 410 is, for example, created on client device 401. In order to save file 410, a client application of JigDFS on client device 401 prompts the user of client device 401 for a password, p, for file 410. The client application hashes p with a hash algorithm to produce hash value $h(p)$. The client application then encrypts file 410 using the hash value $h(p)$, producing encrypted file 411. The client application divides encrypted file 411 into n slices or segments using erasure coding. The client application also hashes hash value $h(p)$ using the hash algorithm to produce hash value $h(h(p))$.

The client application of JigDFS on client device 401 sends each segment of the n segments to one of n different client devices 420. Along with each segment, the client application sends the hash value $h(h(p))$. In other words, the client application sends a segment and hash value pair to each client device of client devices 420.

A hash value is sent along with each segment because JigDFS uses a hashed-key chain algorithm to create a hierarchy tree for each file. In other words, JigDFS further segments the segments of a file in each level or layer of a hierarchy of client devices. Each subsequent layer of client devices stores segments of file segments stored in a previous layer. At each layer, segments of a layer segment are encrypted using the hash value sent with the layer segment.

Consequently, for example, segment 412 of the encrypted file is sent to client device 422 along with hash value $h(h(p))$. In turn, the client application of JigDFS on client device 422 encrypts segment 412 using hash value $h(h(p))$, producing doubly encrypted segment 413. The client application divides doubly encrypted segment 413 into m slices or segments using erasure coding. The client application also hashes hash value $h(h(p))$ using the hash algorithm to produce hash value $h(h(h(p)))$.

The client application of JigDFS on client device 422 sends each segment of the m segments to one of m different client devices 440 in the next layer of client devices. Along with each segment, the client application sends the hash value $h(h(h(p)))$.

This iterative segmenting of file segments continues until a desired file security level (FSL) is reached. Like the password, p, that starts the hierarchy of hash values, the FSL (not shown) is specified or input by the user who saves file 410 on client device 401.

Like BitTorrent, JigDFS can retrieve a file using a DHT. A hash value of each file, $h(f)$, is stored with each segment of the file in the file indexing DHT. When a user requests the file using $h(f)$, the file segments are retrieved from the bottom layer of the hierarchical tree of client devices and sent to the user's client device along routes described by the DHT. Eventually, the user's client device will receive enough segments to recover the encrypted file. The user will then enter the password, p, again to decrypt the reconstructed file using h(p).

Ultimately, sharing a file in JigDFS requires sharing the password, p, of the file. This can provide anonymity since it is not possible to determine the user of the password. It also, however, means that the confidentiality of any file is dependent on the confidentiality of the password. In other words, if the password ends up in the wrong hands, the file system has been breached and there is no way to identify who breached the system. In addition, strong passwords are notoriously difficult to remember and, therefore, often end up being saved using unsecure methods or systems such as an unsecure file.

U.S. Pat. No. 9,363,247 (hereinafter the "'247 Patent") is directed to a method of securely storing blocks of a file across many different storage resources of a computer cluster or cloud system. In the method of '247 Patent, an unencrypted file is saved by sending the unencrypted file to a computer cluster using a secure connection, as is done in Tahoe-LAFS. A computing resource of the computer cluster then divides the file into n blocks, generates a different symmetric key for each block, and then encrypts each block using its symmetric key.

The computing resource of the computer cluster can save each encrypted block of the n blocks on a different storage resource of the computer cluster. Along with each encrypted block, the computer resource stores an encrypted version of the symmetric key used to encrypt the block. The symmetric key is encrypted using a symmetric user key. This encrypting of a key with another key can be referred to as key-wrapping.

In the method of the '247 Patent, a user obtains a user key from a key manager that is separate from but securely connected to the computer cluster or as part of the computer cluster. A user obtains a user key to store or gain access to a file. When a file is stored, the symmetric key of each encrypted block is encrypted with a user key of the user storing the file, and the wrapped key is stored with the encrypted block.

If the file is to be shared among a group of k users including the user saving the file, for example, the computer resource of the computer cluster encrypts the symmetric key of each encrypted block with each of the user keys of the k users, producing k wrapped keys. The computer resource reconstructs the file for a user of the group of k users by first decrypting the wrapped key for the user of each encrypted block, producing the symmetric key for each encrypted block. Each encrypted block is then decrypted, and the decrypted blocks are reconstructed to produce the file for the user.

The method of the '247 Patent describes using a semi-trusted client threat model. Essentially, this means that a user is authenticated using the secure connection to the computer cluster. As a result, the user can obtain the symmetric user key from the key manager and be verified via the secure connection.

The '247 Patent provides an improvement over JigDFS by allowing files to be shared without having to share a password. However, the use of the secure connection in the method of the '247 Patent to obtain symmetric user keys from a key manager makes the key wrapping technique of the '247 Patent unsuitable for a P2P distributed file system. In other words, relying on a secure connection between all peers in a P2P system in order to authenticate user keys significantly increases the complexity of the system. It also provides point of failure and attack.

Despite the many useful teachings outlined in the above references and many more contained in the literature, there exists an unmet need for properly securing the sharing of files and their segments in a P2P distributed file system.

SUMMARY

Systems and methods are disclosed for securely sharing a file among peer devices in a distributed P2P filesystem and for securely retrieving a file in a distributed P2P filesystem. A system for securely sharing a file among peer devices in a distributed P2P filesystem includes a public-key server, a content address server, and a first peer device.

The public key server stores one or more public keys of an asymmetric cryptographic algorithm for one or more users. The content address server stores information about one or more files.

The first peer device generates a unique identifier id(f) for a file f and stores the identifier id(f) on the content address server. The first peer device divides the file f into n segments. The first peer device generates a unique identifier $id(s_i)$ for each segment $s_i$ of the n segments. The first peer device generates a symmetric encryption key KF for encrypting the n segments. The first peer device encrypts each of the n segments using the symmetric key KF using a symmetric encryption algorithm, producing n encrypted segments.

The first peer device stores each encrypted segment $es_i$ of the n segments with its identifier $id(s_i)$ on at least one peer device identified by a unique peer identifier $l_i$. For each encrypted segment $es_i$, the first peer device stores the identifier $id(s_i)$ on a content address server with the identifier id(f). Finally, the first peer device first peer device retrieves from a public key server a public key KU2 of a second user who can share the file f, encrypts the symmetric key KF with the public key KU2 using an asymmetric encryption algorithm, producing wrapped key $KW2=EA_{KU2}(KF)$, and stores the wrapped key KW2 on the content address server with the identifier id(f).

A system for securely retrieving a file in a distributed P2P filesystem includes a public-key server, a content address server, and a second peer device. The second peer device queries a content the address server with the unique identifier id(f) of a file f of a first user. The second peer device receives from the content address server the list of n encrypted segments and the associated peer identifiers of peers storing one or more of the n encrypted segments and a wrapped key KW2 for a second user of the second peer device for file f. The second peer device requests each segment $s_i$ identified by each received identifier $id(s_i)$ of at least m identifiers of the n segments, where m≤n, using a location of a peer device identified by the at least one peer identifier $l_i$ of each segment $s_i$.

The second peer device receives the requested m segments. The second peer device decrypts the received at least one wrapped key KW2 with a private key KPr2 of the second user using an asymmetric encryption algorithm. Symmetric key $KF=EA_{KPr2}^{-1}(KW2)$ is produced. The second peer device decrypts each of the m encrypted segments using the symmetric key KF. Finally, the second peer device reconstructs the file f from the m decrypted segments.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Key-Wrapping Using Asymmetric User Keys

As described above, despite their advantages, decentralized or distributed file systems have not enjoyed widespread adoption due to the fact that they do not provide adequate information confidentiality. Instead, decentralized file systems have primarily be used for public file sharing. For example, BitTorrent is a popular P2P public file-sharing protocol.

Although popular for sharing publicly available information, BitTorrent is not suitable for use as a distributed file system because it lacks facilities for maintaining information confidentiality among users. Tahoe-LAFS is a distributed data store that can be used as a distributed file system that includes a method of securing information confidentiality among users but is not a P2P system. Cleversafe is another distributed data store that can be used as a distributed file system. Like Tahoe-LAFS, Cleversafe divides encrypted files into m pieces or segments using erasure coding and stores the segments on different servers. Unfortunately, also like Tahoe-LAFS, Cleversafe is not a P2P system.

Also, the Bian Paper suggests that the lack of anonymity or deniability in systems like Tahoe-LAFS and Cleversafe makes them less useful in commercial or business settings. For example, the use of central servers in Tahoe-LAFS and Cleversafe make it easier to track the owners or editors of certain files. As a result, it would be possible, for example, to link a file for anonymous feedback to its editors in these systems.

In response to this problem, the Bian Paper proposes JigDFS, which is a secure P2P distributed file system. Ultimately, sharing a file in JigDFS requires sharing the password, p, of the file. This can provide anonymity since it is not possible to determine the user of the password. It also, however, means that the confidentiality of any file is dependent on the confidentiality of the password. In other words, if the password ends up in the wrong hands, the file system has been breached and there is no way to identify who breached the system. In addition, strong passwords are notoriously difficult to remember and, therefore, often end up being saved using unsecure methods or systems such as an unsecure file.

In the method of '247 Patent, key-wrapping is used to secure a file. The '247 Patent provides an improvement over JigDFS by allowing files to be shared without having to share a password. However, the use of the secure connection in the method of the '247 Patent to obtain symmetric user keys from a key manager makes the key wrapping technique of the '247 Patent unsuitable for a P2P distributed file system. In other words, relying on a secure connection between all peers in a P2P system in order to authenticate user keys significantly increases the complexity of the system.

Despite the many useful teachings outlined in the above references, there exists an unmet need for properly securing the sharing of files and their segments in a P2P distributed file system.

In various embodiments, systems and methods use asymmetric user keys to secure the sharing of files and their segments in a P2P distributed file system. The asymmetric user keys are used in key-wrapping. A different symmetric key is used to encrypt each shared file of the system. A user is given access to a file by encrypting the symmetric key of the file with the user's public key and giving the user access to the wrapped key. The user accesses the file by decrypting the wrapped key with the user's private key.

The use of asymmetric user keys to maintain information confidentially and to maintain user anonymity in a P2P distributed file system is a large improvement over the use of passwords in JigDFS. Keeping track of asymmetric keys issued per user is much less complex and expensive in terms of computer processing and storage resources than keeping track of the passwords set and shared per file. It also can be managed in a decentralized manner.

Similarly, the use of asymmetric user keys to wrap the symmetric keys used to encrypt files is a large improvement over the key-wrapping of the '247 Patent. In order to wrap the symmetric keys of a block of a file with symmetric user keys, the '247 Patent requires that symmetric user keys be communicated over a secure connection. No such secure connection is needed with the use of asymmetric user keys. As a result, the burden on network communication resources is substantially reduced over the '247 Patent.

System for Sharing a File

Figure 5:
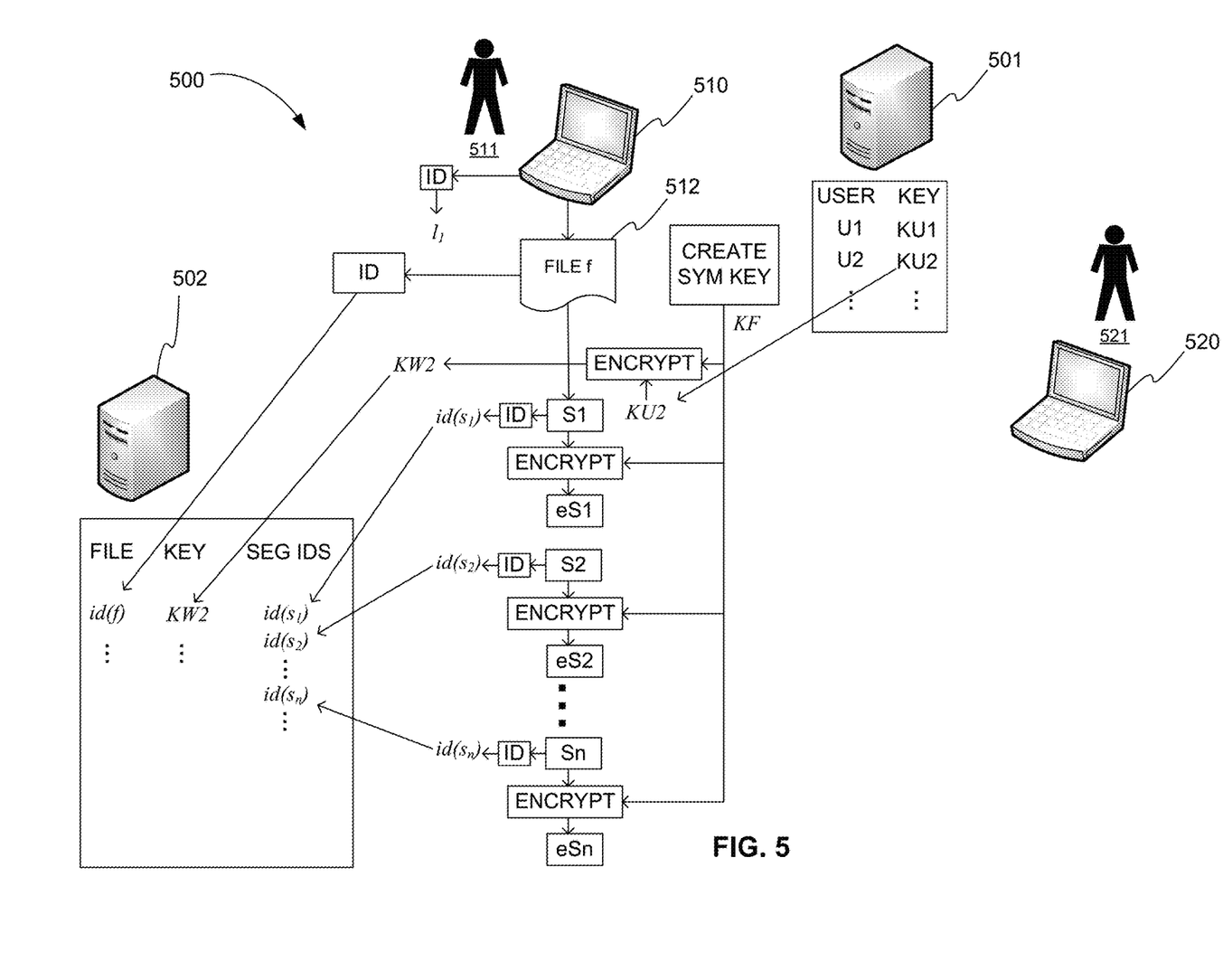
FIG. 5 is an exemplary diagram showing a system for securely sharing a file among peer devices in a distributed P2P filesystem, in accordance with various embodiments.

FIG. 5 is an exemplary diagram 500 showing a system for securely sharing a file among peer devices in a distributed P2P filesystem, in accordance with various embodiments. The system of FIG. 5 includes public-key server 501, content address server 502, and first peer device 510.

Public key server 501 stores one or more public keys of an asymmetric cryptographic algorithm for one or more users. Public key server 501 can be a computer service residing on any type of computer system including, but not limited to, the computer system of FIG. 1.

Content address server 502 stores information about one or more files. Like public key server 501, content address server 502 can be a computer service residing on any type of computer system including, but not limited to, the computer system of FIG. 1.

First peer device 510 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

When, for example, a first user 511 saves a file f 512 that first user 511 wants to be sharable with a second user 521 of a second peer device 520, first peer device 510 performs several steps using a client application of the distributed P2P filesystem. First peer device 510 generates a unique identifier id(f) for file f 512 and stores the identifier id(f) on content address server 502. First peer device 510 can also, for example, store the identifier id(f) locally.

First peer device 510 divides file f 512 into n segments. First peer device 510 generates a unique identifier $id(s_i)$ for each segment $s_i$ of the n segments. First peer device 510 generates a symmetric encryption key KF for encrypting the n segments. First peer device 510 encrypts each of then segments using the symmetric key KF using a symmetric encryption algorithm, producing n encrypted segments. First peer device 510 stores each encrypted segment $es_i$ of the n segments with its identifier $id(s_i)$ on at least one peer device identified by a unique peer identifier $l_i$. In various embodiments and as shown in FIG. 5, the n encrypted segments are stored on first peer device 510, which is location $l_1$. For each encrypted segment $es_i$, first peer device 510 stores the identifier $id(s_i)$ on content address server 502 with the identifier id(f).

Finally, first peer device 510 retrieves from public key server 501 a public key KU2 of second user 521 who can share file f 512, encrypts the symmetric key KF with the public key KU2 using an asymmetric encryption algorithm, producing wrapped key KW2=$EA_{KU2}(KF)$, and stores the wrapped key KW2 on content address server 502 with the identifier id(f), for example. First peer device 510 can also or alternatively, for example, store the wrapped key KW2 on first pear device 510. Essentially, the information stored on content address server 502 for the identifier id(f) makes file f 512 sharable by second user 521 using second peer device 520.

In various embodiments, content address server 502 can be a distributed hash table. The identifier id(is then a cryptographic hash value h(f) and is generated using a cryptographic hashing algorithm. Also, the unique identifier id($s_i$) for each segment $s_i$ of the n segments is a cryptographic hash value h($s_i$) and is generated using the cryptographic hashing algorithm.

In various embodiments, first peer device 510 further notifies second peer device 520 of file f 512. For example, first peer device 510 sends the identifier id(f) to second peer device 520 used by second user 521 to let second user 521 know that file f 512 is available.

In various embodiments, first peer device 510 sends the identifier id(f) to second peer device 520 that the P2P filesystem application of second peer device 520 stores in the form of a symbolic link. Similarly, first peer device 510 can also send the wrapped key KW2 for second user 521 with identifier id(f) to second peer device 520. The P2P filesystem application of second peer device 520 then also stores the wrapped key KW2 for second user 521 in the symbolic link. In other words, to second user 521 of second peer device 520, file f 512 appears as any other file in the filesystem of second peer device 520 even though none of the segments of file f 512 may currently be stored on second peer device 520.

In addition or alternately, if content address server 502 is a distributed hash table, when first peer device 510 stores the identifier id(f) on content address server 502 second peer device 520 is automatically notified of file f 512. For example, content address server 502 automatically publishes an update to the distributed hash table accessible to second peer device 520 when file f 512 is added. Second peer device 520 can also be automatically notified of the wrapped key KW2 for second user 521 for file f 512.

In various embodiments, first peer device 510 does not initially store the n encrypted segments, $es_i$, of file f 512 on any other peers. All of the n encrypted segments are only stored on another peer after that peer has received the identifier id(f) of file f 512 and opened the file. Opening the file on another peer, for example, causes then encrypted segments, $es_i$, of file f 512 to be transmitted to and received by that peer from one or more other peers.

In various embodiments, first peer device 510 stores segments across different peer devices. Specifically, first peer device 510 stores each segment $s_i$ of the n segments with its identifier id($s_i$) on a different peer device identified by a unique peer identifier $l_i$.

In various embodiments, redundancy is provided in segments stored across different peer devices using erasure coding. Specifically, first peer device 510 divides file f 512 using erasure coding so that file f 512 can be reconstructed from m segments of then segments where m<n.

In various embodiments, content address server 502 stores a wrapped key with a file identifier for each user that can share the file. For example, a wrapped key for first user 511 also needs to be stored with identifier id(f) so that first user 511 can reconstruct file f 512. Specifically, first peer device 510 further retrieves from public key server 501 a public key KU1 of first user 511, encrypts the symmetric key KF with the public key KU1 using the asymmetric encryption algorithm, producing wrapped key KW1=$EA_{KU1}(KF)$, and stores the wrapped key KW1 on content address server 502 with the identifier id(f).

In various embodiments, content address server 502 additionally stores a user identifier with each wrapped key. Additionally or alternatively, each wrapped key can be stored on a peer device along with the file identifier.

System for Retrieving a File

Figure 6:
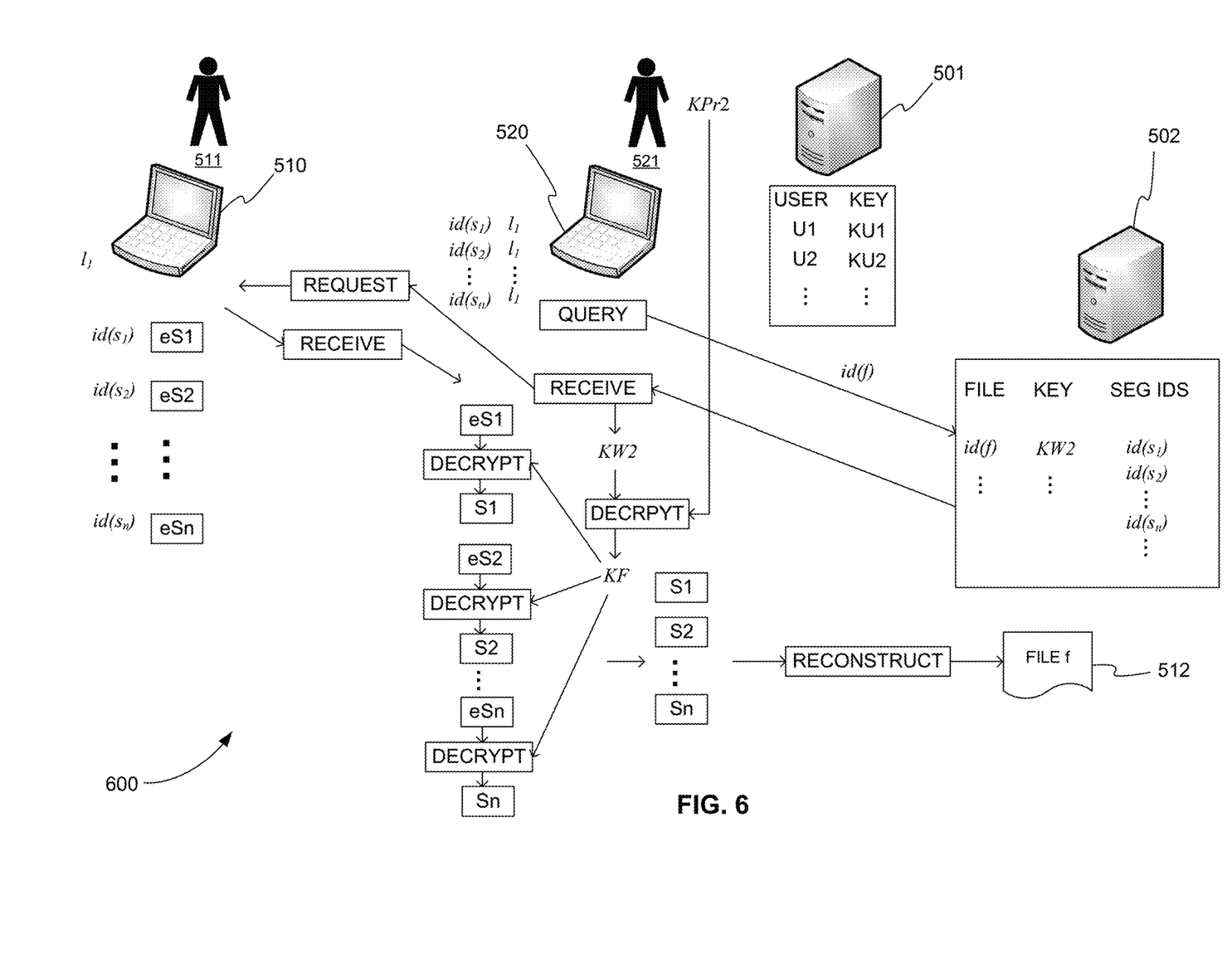
FIG. 6 is an exemplary diagram showing a system for securely retrieving a file in a distributed P2P filesystem, in accordance with various embodiments.

FIG. 6 is an exemplary diagram 600 showing a system for securely retrieving a file in a distributed P2P filesystem, in accordance with various embodiments. The system of FIG. 6 includes public-key server 501, content address server 502, and second peer device 520. These devices are also shown in FIG. 5.

When, for example, second peer device 520 of second user 521 receives the identifier id(f) of file f 512 from first peer device 510 or searches content address server 502 for metadata included by file f 512 and finds the identifier id(f), second peer device 520 performs several steps using a client application of the distributed P2P filesystem to retrieve the file. In various embodiments, content address server 502 further stores searchable metadata (not shown) of file f 512 with the identifier id(f), for example.

Second peer device 520 queries content address server 502 with the unique identifier id(f) of file f 512 of first user 511. In turn, content address server 502 queries its list of peers for n encrypted segments, $es_i$, of file f 512 using the segment identifiers id($s_i$) associated with identifier id(f). Content address server 502 returns a list of locations $l_i$ of other peers that have stored one or more of the n encrypted segments.

Second peer device 520 receives from content address server 502 the list of n encrypted segments and the associated peer identifiers of peers storing one or more of the n encrypted segments. In an alternative embodiment, second peer device 520 can derive the identity of the file in question, its associated segments, and the peer or peers on which the segments are available from the file identity received from the content address server 502. Second peer device 520 can also receive from content address server 502 the wrapped key KW2 for second user 521 for file f 512. For example, second peer device 520 receives the wrapped key KW2 for second user 521 from the content address server 502 in response to the query with the unique identifier id(f). In various embodiments, each wrapped key is stored on content address server 502 with a key identifier that ties or associates each wrapped key with a specific user. Alternatively, second peer device 520, for example, can receive multiple wrapped keys and determine the correct wrapped key by decrypting each wrapped key with the private key of second user 521.

Note that in FIGS. 5 and 6 and as described above, file identifiers, segment identifiers, and wrapped keys are shown and described as being stored on one content address server 502. In various alternative embodiments, file identifiers, segment identifiers, and wrapped keys can be stored separately or in any combination on separate servers. For example, file and segment identifiers may be stored in a DHT and wrapped keys with a file identifier may be stored in a separate key server.

In various alternative embodiments, second peer device 520 may have already received the wrapped key KW2 for second user 521 for file f along with the identifier id(f) of file f 512. The wrapped key KW2 for second user 521 may have been received and stored in a symbolic link as described above.

Using the client application of the distributed P2P filesystem on second peer device 520, second peer device 520 analyzes the list of n encrypted segments and the associated peer identifiers of peers storing one or more of the n encrypted segments for the most efficient method of receiving the n encrypted segments from peers. In other words, the client application considers routing and network speed information to determine the most efficient method of obtaining the n encrypted segments from the list of associated peers.

Second peer device 520 then requests each segment $s_i$ identified by each received identifier $id(s_i)$ of at least m identifiers of the n segments, where m≤n, using a location of a peer device identified by the at least one peer identifier $l_i$ of each segment $s_i$.

As shown in FIG. 6, the file f 512 has only just been created by first user 511, for example, and, therefore, the n encrypted segments only reside on first peer device 510, which has peer identifier $l_1$. As a result, second peer device 520 receives from content address server 502 the list of n encrypted segments all associated with the peer identifier $l_1$. As a result, the n segments are requested from first peer device 510 in this example.

Second peer device 520 receives the requested m segments from the request. Second peer device 520 reconstructs or recreates file f 512 from the received m encrypted segments.

In various embodiments and as shown in FIG. 6, m segments can equal n segments. As a result, second peer device 520 reconstructs file f 512 from all n encrypted segments.

Second peer device 520 decrypts the received at least one wrapped key KW2 with a private key KPr2 of second user 521 using an asymmetric encryption algorithm. Symmetric key $KF=EA_{KPr2}^{-1}(KW2)$ is produced. Second peer device 520 decrypts each of the n encrypted segments using the symmetric key KF. In various embodiments, there is an error checking component at each stage. For example, if a decryption fails, the process is aborted and the encrypted segment is obtained from another peer.

Finally, second peer device 520 reconstructs file f 512 from then decrypted segments. Reconstruction has an error checking component as well—if the identifier of each decrypted segment does not match the contents of the segment, there is an attempt to retrieve the segment from a different peer, if the retrieval fails, the process is aborted. Similarly, the assembled file is error checked and either approved or the process aborted.

Again, as described above and in various embodiments, content address server 502 can be a distributed hash table. The identifier id(f) is then a cryptographic hash value h(f) and is generated using a cryptographic hashing algorithm. In various embodiments, content address server 502 further generates a hash value for the file fusing the cryptographic hashing algorithm and compares the hash value to h(f) to verify the file f 512.

Also, the unique identifier $id(s_i)$ for each segment $s_i$ of the n segments is a cryptographic hash value $h(s_i)$ and is generated using the cryptographic hashing algorithm. In various embodiments, content address server 502 further after decrypting each encrypted segment $es_i$ of the m received encrypted segments, generates a hash value for each decrypted segment s using the cryptographic hashing algorithm and comparing the hash value to $h(s_i)$ to verify each decrypted segment $s_i$.

In various embodiment, before querying content address server 502 with the identifier id(f), second peer device 520 receives the identifier id(f) from first peer device 510 used by first user 511. In other words, second peer device 520 is first notified by first peer device 510 that file f 512 identified by identifier id(is sharable.

In various embodiment, second peer device 520 reconstructs encrypted file f 513 using m segments of the n segments where m<n using erasure decoding. In other words, if all n segments are created using erasure coding, then only a subset m of the segments needs to be used to reconstruct file f 512.

Method for Sharing a File

Figure 7:
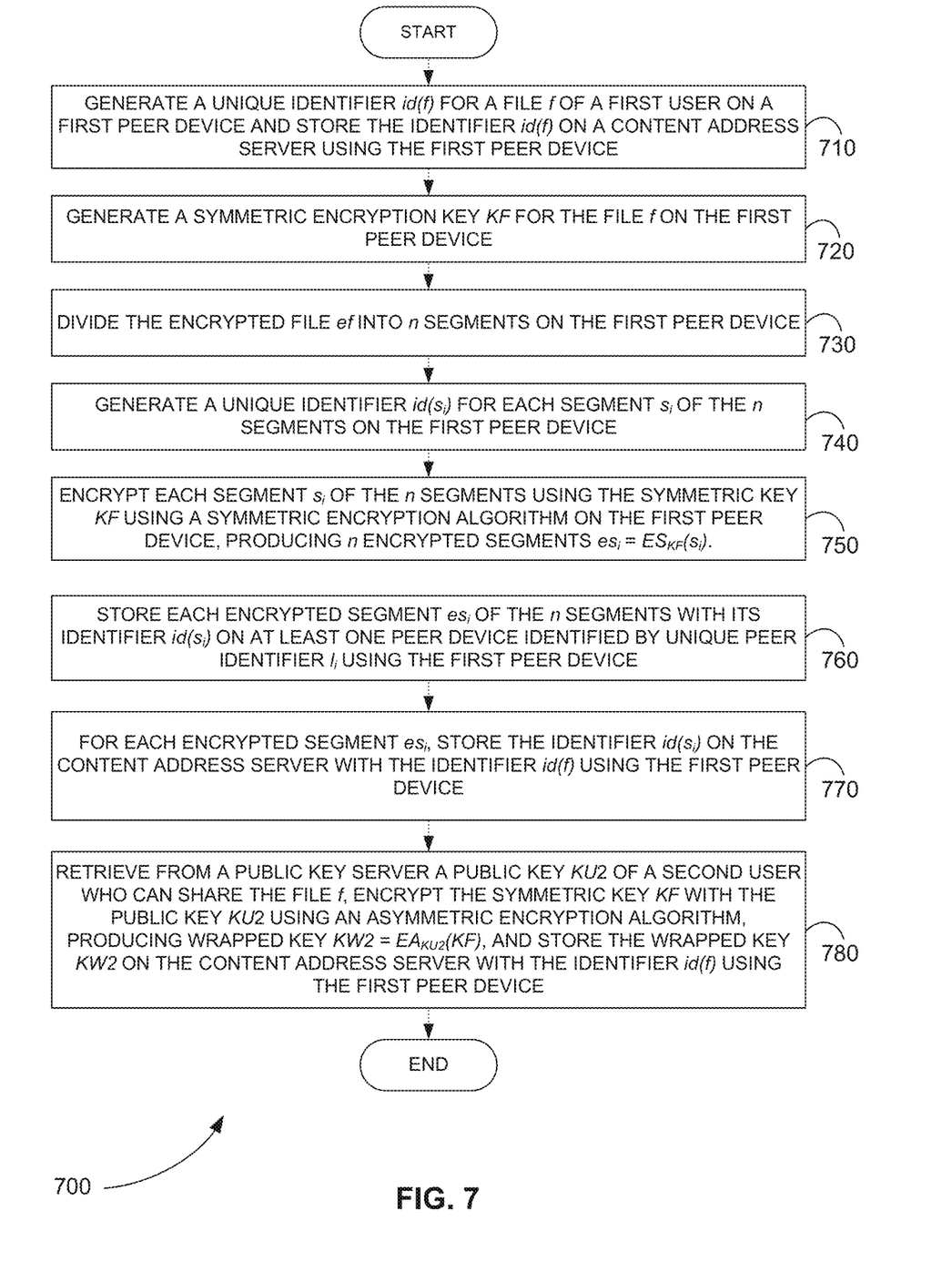
FIG. 7 is a flowchart showing a computer-implemented method for securely sharing a file among peer devices in a distributed P2P filesystem, in accordance with various embodiments.

FIG. 7 is a flowchart showing a computer-implemented method 700 for securely sharing a file among peer devices in a distributed P2P filesystem, in accordance with various embodiments.

In step 710 of method 700, a unique identifier id(f) is generated for a file f of a first user on a first peer device, and the identifier id(f) is stored on a content address server using the first peer device.

In step 720, a symmetric encryption key KF is generated for the file f on the first peer device.

In step 730, the file f is divided into n segments on the first peer device.

In step 740, a unique identifier $id(s_i)$ is generated for each segment $s_i$ of the n segments on the first peer device.

In step 750, each segment $s_i$ of the n segments is encrypted using the symmetric key KF using a symmetric encryption algorithm on the first peer device, producing n encrypted segments $es_i=ES_{KF}(s_i)$.

In step 760, each encrypted segment $es_i$ of the n segments is stored with its identifier $id(s_i)$ on at least one peer device identified by a unique peer identifier $l_i$ using the first peer device.

In step 770, for each encrypted segment $es_i$, the identifier $id(s_i)$ is stored on the content address server with the identifier id(f) using the first peer device.

In step 780, a public key KU2 of a second user who can share the file f is retrieved from a public key server. The symmetric key KF is encrypted with the public key KU2 using an asymmetric encryption algorithm, producing wrapped key $KW2=EA_{KU2}(KF)$. The wrapped key KW2 is stored on the content address server with the identifier id(f) using the first peer device.

Method for Retrieving a File

Figure 8:
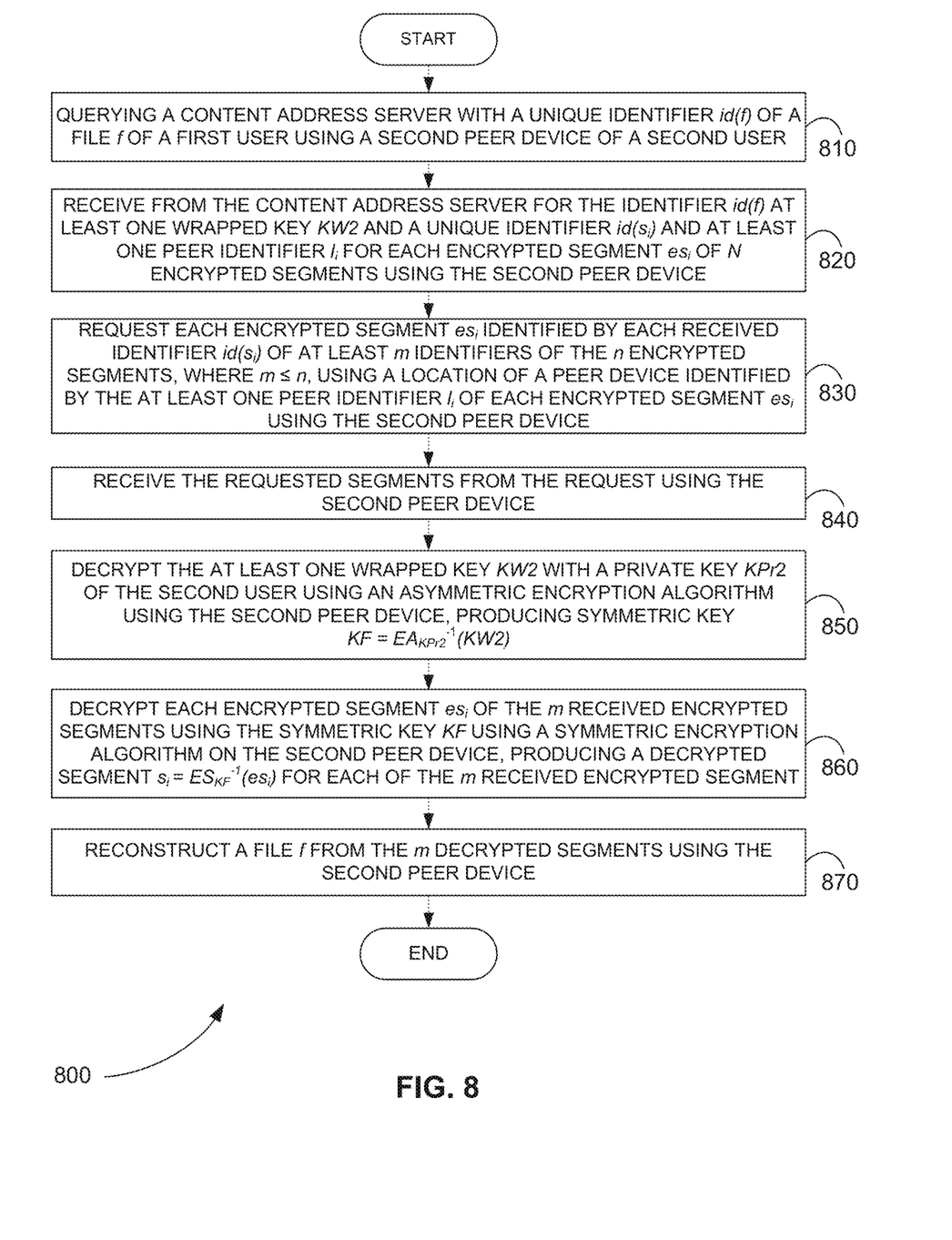
FIG. 8 is a flowchart showing a computer-implemented method for securely retrieving a file in a distributed P2P filesystem, in accordance with various embodiments.

FIG. 8 is a flowchart showing a computer-implemented method 800 for securely retrieving a file in a distributed P2P filesystem, in accordance with various embodiments.

In step 810 of method 800, a content address server is queried with a unique identifier id(f) of a file f of a first user using a second peer device of a second user.

In step 820, at least one wrapped key KW2 and a unique identifier $id(s_i)$ and at least one peer identifier $l_i$ for each encrypted segment $es_i$ of n encrypted segments are received from the content address server for the identifier id(f) using the second peer device.

In step 830, each encrypted segment $es_i$ identified by each received identifier $id(s_i)$ of at least m identifiers of the n encrypted segments, where m≤n, is requested using a location of a peer device identified by the at least one peer identifier $l_i$ of each encrypted segment $es_i$ using the second peer device.

In step 840, the requested m encrypted segments are received from the request using the second peer device.

In step 850, the at least one wrapped key KW2 is decrypted with a private key KPr2 of the second user using an asymmetric encryption algorithm using the second peer device, producing symmetric key $KF=EA_{KPr2}^{-1}(KW2)$.

In step 860, each encrypted segment $es_i$ of the m received encrypted segments is decrypted using the symmetric key KF using a symmetric encryption algorithm on the second peer device, producing a decrypted segment $s_i=ES_{KF}^{-1}(es_i)$ for each of the m received encrypted segments.

In step 870, a file f is reconstructed from the m decrypted segments using the second peer device While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A computer-implemented method for decrypting persistent user cryptographic keys in a distributed cryptographically secured peer-to-peer filesystem, comprising:
receiving a primary input value from a first user on a first peer device;
generating a symmetric user encryption key UK1 for the first user from the primary input value on the first peer device;
requesting and receiving an encrypted private key ePrK1 from a non-volatile memory of a data persistence server using the first peer device;
decrypting the encrypted private key ePrK1 using the symmetric user encryption key UK1 using a symmetric decryption algorithm on the first peer device, producing a private key $PrK1=ES_{UK1}^{-1}(ePrK1)$; and
receiving a secondary input value from the first user on the first peer device, wherein the secondary input value comprises digitized information captured by a biometric sensor.

2. A computer-implemented method for decrypting persistent user cryptographic keys in a distributed cryptographically secured peer-to-peer filesystem, comprising:
receiving a primary input value from a first user on a first peer device;
generating a symmetric user encryption key UK1 for the first user from the primary input value on the first peer device;
requesting and receiving an encrypted private key ePrK1 from a non-volatile memory of a data persistence server using the first peer device;
decrypting the encrypted private key ePrK1 using the symmetric user encryption key UK1 using a symmetric decryption algorithm on the first peer device, producing a private key $PrK1=ES_{UK1}^{-1}(ePrK1)$;
receiving a secondary input value from the first user on the first peer device; and
only storing the symmetric user encryption key UK1 in volatile memory on the first peer device.

3. The method of claim 2, further comprising purging the symmetric user encryption key UK1 from volatile memory on the first peer device when the first user logs off of a session on the first peer device.

4. A computer-implemented method for decrypting persistent user cryptographic keys in a distributed cryptographically secured peer-to-peer filesystem, comprising:
receiving a primary input value from a first user on a first peer device;
generating a symmetric user encryption key UK1 for the first user from the primary input value on the first peer device;
requesting and receiving an encrypted private key ePrK1 from a non-volatile memory of a data persistence server using the first peer device;
decrypting the encrypted private key ePrK1 using the symmetric user encryption key UK1 using a symmetric decryption algorithm on the first peer device, producing a private key $PrK1=ES_{UK1}^{-1}(ePrK1)$;
querying a content address server with a unique identifier id(f) of a file f of a second user using the first peer device of the first user;
receiving from the content address server for the unique identifier id(f) at least one wrapped key KW1 and a unique identifier $id(s_i)$ and at least one peer identifier $l_i$, for each encrypted segment $es_i$, of n encrypted segments using the first peer device;
requesting each encrypted segment $es_i$, identified by each received unique identifier $id(s_i)$ of at least m identifiers of the n encrypted segments, producing m encrypted segments, where m≤n, using a location of a peer device identified by the at least one peer identifier $l_i$, of each encrypted segment $es_i$, using the first peer device;
receiving the requested m encrypted segments from the request using the first peer device;
decrypting the at least one wrapped key KW1 with the private key PrK1 of the first user using an asymmetric encryption algorithm using the first peer device, producing symmetric encryption key $KF=EA_{PrK1}^{-1}(KW1)$;
decrypting each encrypted segment $es_i$, of the m received encrypted segments using the symmetric encryption key KF using a symmetric encryption algorithm on the first peer device, producing a decrypted segment $s_i=ES_{KF}^{-1}(es_i)$ for each of the m received encrypted segments; and
reconstructing a file f from the m decrypted segments using the first peer device.

* * * * *